United States Patent [19]
Grimm

[11] Patent Number: 5,955,872
[45] Date of Patent: *Sep. 21, 1999

[54] LOW DROP-OUT SWITCHING REGULATORS

[75] Inventor: Michael Arthur Grimm, Boulder Creek, Calif.

[73] Assignee: Maxim Integrated Products, Inc., Sunnyvale, Calif.

[*] Notice: This patent is subject to a terminal disclaimer.

[21] Appl. No.: 09/040,241

[22] Filed: Feb. 20, 1998

Related U.S. Application Data

[63] Continuation of application No. 08/456,739, Jun. 1, 1995.

[51] Int. Cl.$^6$ .................................................. G05F 1/618
[52] U.S. Cl. .......................... 323/283; 323/271; 323/284
[58] Field of Search .................................. 323/271, 282, 323/283, 284, 285

[56] References Cited

U.S. PATENT DOCUMENTS

| | | | |
|---|---|---|---|
| 3,736,495 | 5/1973 | Calkin et al. | 323/286 |
| 3,781,653 | 12/1973 | Marini | 323/284 |
| 4,316,136 | 2/1982 | Saxarra et al. | 323/282 |
| 4,580,090 | 4/1986 | Bailey et al. | 323/282 |
| 4,931,716 | 6/1990 | Jovanovic et al. | 323/285 |
| 5,045,771 | 9/1991 | Kislovski | 323/285 |
| 5,126,652 | 6/1992 | Carlin | 323/282 |
| 5,355,077 | 10/1994 | Kates | 323/271 |
| 5,359,280 | 10/1994 | Canter et al. | 323/282 |
| 5,479,089 | 12/1995 | Lee | 323/282 |
| 5,814,979 | 9/1998 | Grimm | 323/284 |

FOREIGN PATENT DOCUMENTS

| | | | |
|---|---|---|---|
| 0650249 | 4/1995 | European Pat. Off. | H02M 3/156 |
| 0709948 | 5/1996 | European Pat. Off. | H02M 3/156 |

*Primary Examiner*—Jeffrey Sterrett
*Attorney, Agent, or Firm*—Hickman Stephens & Coleman, LLP

[57] ABSTRACT

A method for generating, in a switching power supply, an output voltage from an input voltage. The method includes the step of closing a switch in the switching power supply to permit current from the input source to flow through the inductor and the capacitor of the switching power supply, thereby building up an inductor current through the inductor and increasing the output voltage across the capacitor. If a combination of the output voltage and inductor current is satisfactory at the start of an off-time of the oscillator signal, the method opens the switch. If a combination of the output voltage and inductor current is unsatisfactory at the start of an off-time of the oscillator signal, the inventive method preferably keeps the switch closed past the off time of the oscillator signal to continue building up the inductor current through the inductor and increasing the output voltage across the capacitor.

28 Claims, 6 Drawing Sheets

LOW DROP-OUT SWITCHING REGULATORS

This is a Continuation application of co-pending U.S. patent application Ser. No. 08/456,739, filed Jun. 1, 1995, which co-pending application is incorporated herein by reference in its entirety.

BACKGROUND OF THE INVENTION

The present invention relates to switching power supplies. In particular, the invention relates to a method and apparatus for permitting a switching power supply to produce a regulated output voltage at lower input voltages than was possible in the prior art.

Switching power supplies (SPS) are known in the art. Typical uses of switching power supplies include generating a constant, regulated output voltage Vout from an input source, whose voltage Vin may be decreasing in amplitude over time. As an example, a switching power supply may be used to generate a regulated output voltage Vout from the potential difference across terminals of a battery in order to operate an electrical device such as a portable computer, a radio, a CD player, or the like. As the electrical device drains energy from the battery, the input voltage Vin supplied by the battery diminishes over time, and it is the job of the switching power supply to continue generating a steady output voltage Vout to keep the electrical device operating.

In designing switching power supplies, the challenge has been to keep a switching power supply in regulation for as long as possible, i.e., to continue generating the regulated output voltage Vout for as long as possible as the input voltage Vin drops toward zero. To facilitate discussion, FIG. 1 is an illustration of an input voltage Vin line versus a regulated output voltage Vout line for a typical prior art switching power supply (SPS).

In the example of FIG. 1, when Vin is high, e.g., 7 V, the SPS produces a regulated output voltage Vout at say 5 V.

When Vin drops below a threshold, say 5.5 V, the SPS no longer stays in regulation, and the output voltage Vout can no longer be maintained at its regulated 5 V value. FIG. 1 is representative of the Vin/Vout characteristics of a typical SPS since typical SPS's usually go out of regulation when their input voltage Vin come within 10% of their regulated output voltage Vout. On the Vout line, the point where the SPS goes out of regulation is shown as point 200. The difference between the input voltage Vin and the regulated output voltage Vout at the point where the SPS goes out of regulation is called the drop-out voltage. In the example of FIG. 1, the drop-out voltage is 0.5 V (5.5 V–5 V).

It has been found that by reducing the drop-out voltage, i.e., the difference between the input voltage Vin and the output voltage Vout at the point where the SPS goes out of regulation, it is possible to generate the desired regulated output voltage Vout at lower input voltages. The ability to continue generating a regulated output voltage Vout for a longer period of time responsive to a diminishing input voltage Vin is highly desirable because the longer the SPS can stay in regulation, the longer the electrical device which depends on the SPS and the input source for its energy needs can operate. By way of example, SPS's with low drop out voltages may permit portable computers to operate for a longer period of time on their batteries.

Consequently, what is desired is an improved method and apparatus for permitting a switching power supply (SPS) to stay in regulation at lower input voltages than was possible in the prior art.

SUMMARY OF THE INVENTION

The invention relates to a method for generating, in a switching power supply, an output voltage from an input voltage, which input voltage is supplied by an input source such as a battery. The method includes the step of closing a switch in the switching power supply to permit current from the input source to flow through the inductor and the capacitor of the switching power supply, thereby building up an inductor current through the inductor and increasing the output voltage across the capacitor. If a combination of the output voltage and inductor current is satisfactory at the start of an off-time of the oscillator signal, the method opens the switch.

Unlike the prior art method which automatically opens the switch when the oscillator signal enters its off time, the inventive method preferably keeps the switch closed past an off time of the oscillator signal to continue building up the inductor current through the inductor and increasing the output voltage across the capacitor if a combination of the output voltage and inductor current is unsatisfactory at the start of an off-time of the oscillator signal. By keeping the switch closed past an off time of the oscillator signal when the input voltage drops to a level where it becomes necessary to keep the inductor current ramped up for a longer period of time than the duration of an oscillator signal cycle, the invention advantageously allows the switching power supply to stay in regulation at lower input voltage levels than was possible in the prior art.

The invention also relates to an apparatus in a switching power supply for generating an output voltage from an input voltage, which input voltage is supplied by an input source. The inventive apparatus includes a first circuit for closing the switch to permit current from the input source to flow through the inductor and the capacitor of the switching power supply, thereby building up an inductor current through the inductor and increasing the output voltage across the capacitor. The inventive apparatus also includes a second circuit for opening the switch if a combination of the output voltage and inductor current is satisfactory at the start of an off-time of the oscillator signal.

The inventive apparatus further includes a third circuit for keeping the switch closed past an off time of the oscillator signal to continue building up the inductor current through the inductor and increasing the output voltage across the capacitor if a combination of the output voltage and inductor current is unsatisfactory at the start of an off-time of the oscillator signal. By keeping the switch closed to increase the output voltage for a longer period of time than the duration of one oscillator signal cycle when necessary, the inventive apparatus advantageously keeps the switching power supply in regulation at a lower drop out voltage than was possible in the prior art.

BRIEF DESCRIPTION OF THE DRAWINGS

Additional advantages of the invention will become apparent upon reading the following detailed description and upon reference to the drawings, in which:

FIG. 3B is a circuit diagram illustrating a pulse width modulation switching power supply (SPS) incorporating a bipolar transistor as the high side switch and a diode as the low side switch in accordance with one aspect of the invention.

DETAILED DESCRIPTION OF THE INVENTION

Figure 1:
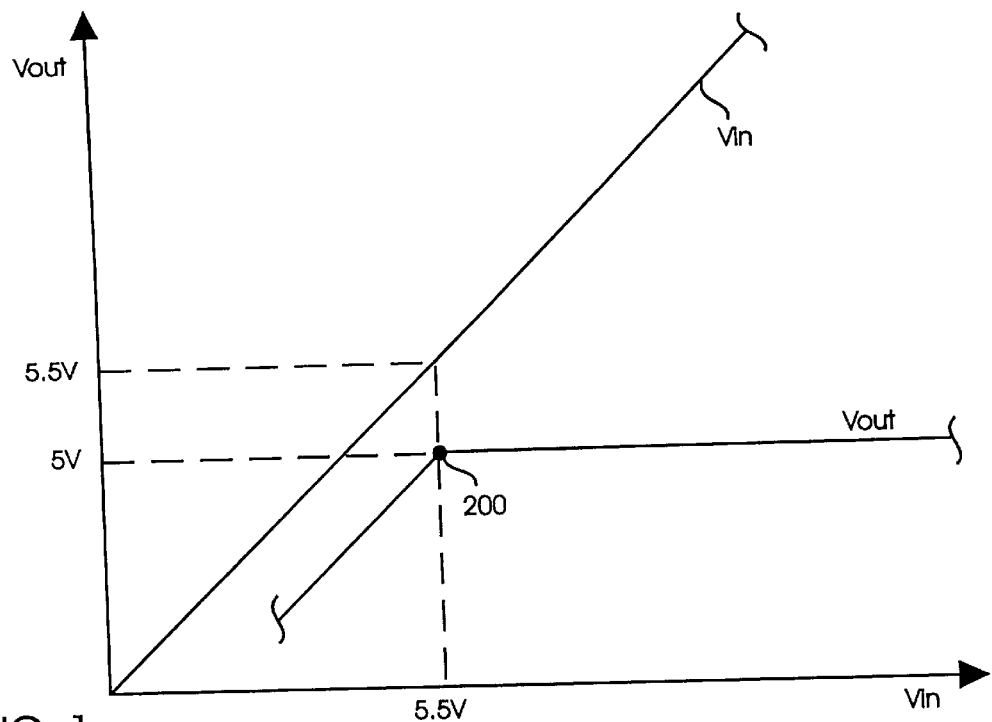
FIG. 1 is an illustration of an input voltage Vin line versus a regulated output voltage Vout line for a typical prior art switching power supply (SPS)
Figure 2:
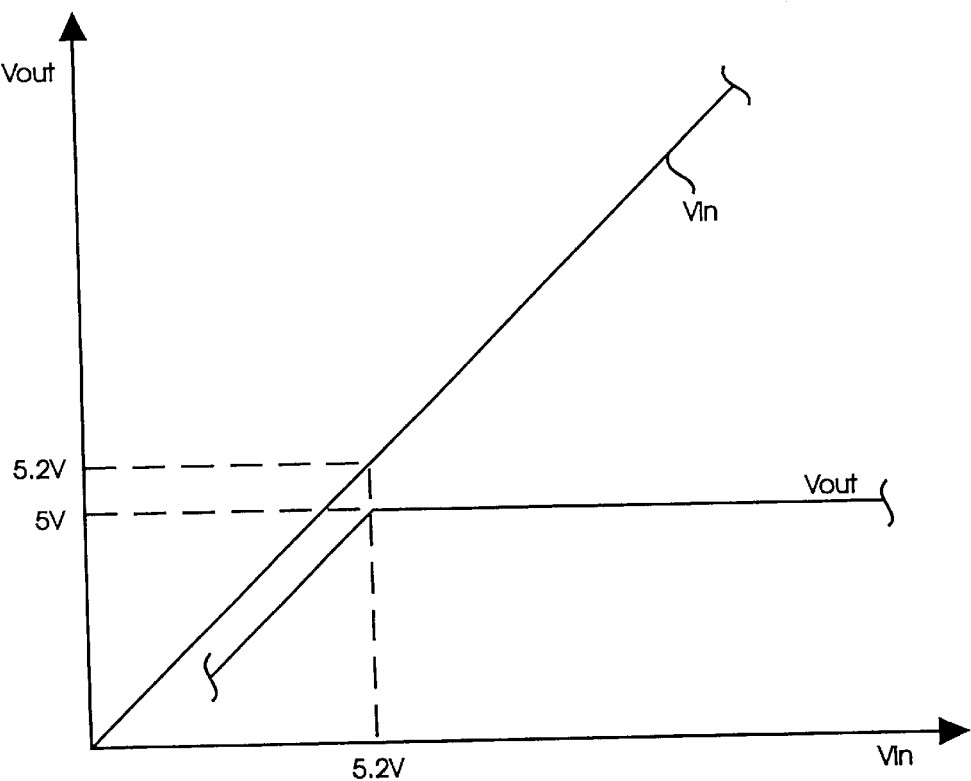
FIG. 2 is an illustration of the input voltage Vin line versus the output voltage Vout line in one embodiment of the inventive switching power supply.

FIG. 2 is an illustration of the input voltage Vin line versus the output voltage Vout line for one embodiment of the inventive switching power supply as the drop-out voltage is reduced from 0.5 V to 0.2 V. As shown in FIG. 2, when the drop-out voltage is reduced, the threshold at which the inventive SPS goes out of regulation moves closer to the regulated output voltage Vout value, i.e., from 5.5 V in FIG. 1 to 5.2 V in FIG. 2. In other words, instead of ceasing to supply the regulated output voltage Vout when Vin reaches 5.5 V, the inventive SPS preferably continues to supply the desired regulated output voltage Vout until Vin drops to 5.2 V. As a consequence, electrical devices using the inventive SPS may be able to operate for an additional period of time, e.g., the additional time it takes for the input voltage Vin of the example of FIG. 2 to drop from 5.5 V to 5.2 V.

Figure 3:
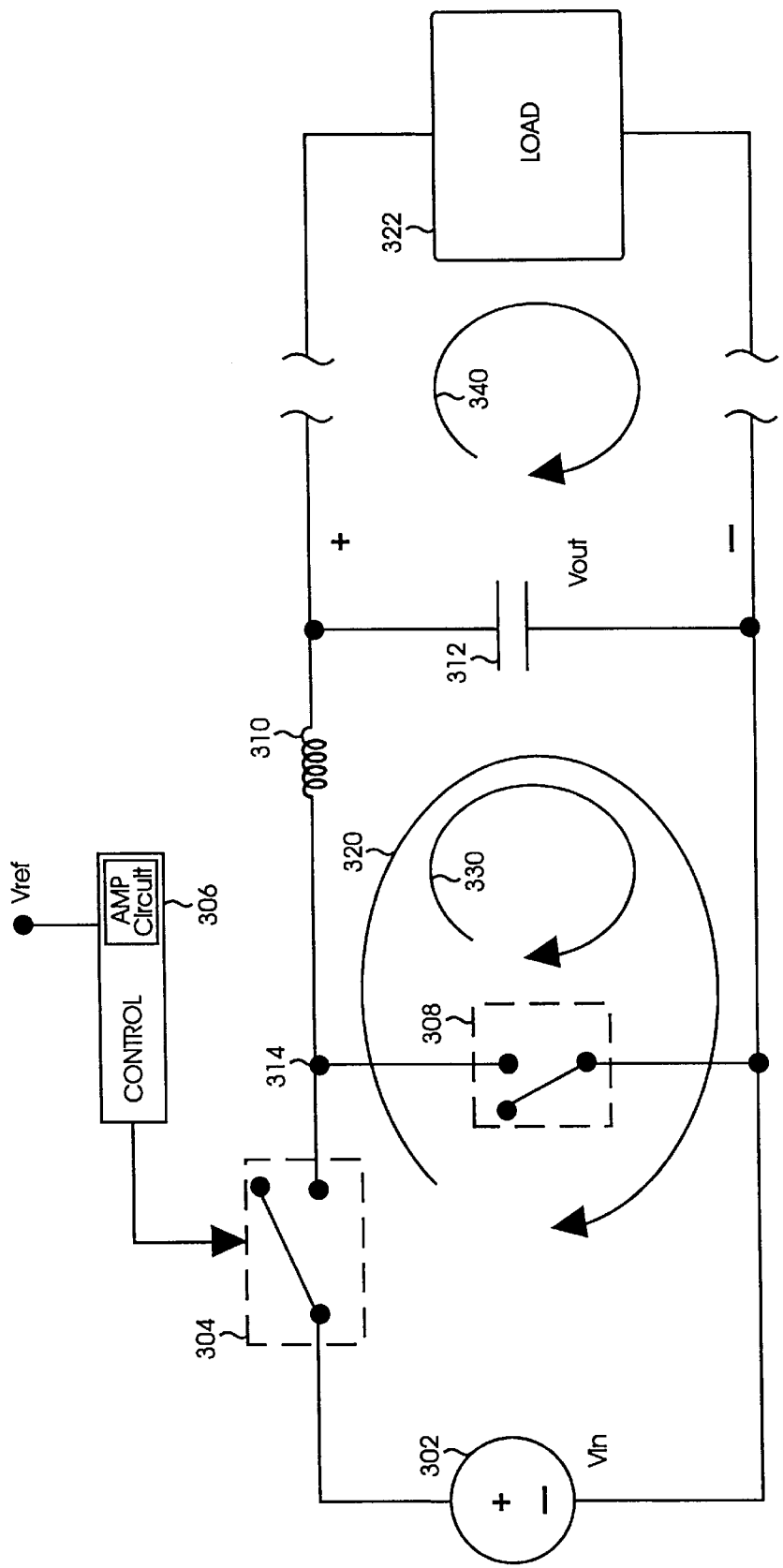
FIG. 3 is a circuit diagram illustrating a pulse width modulation switching power supply (SPS) in accordance with one aspect of the invention.

FIG. 3 is a circuit diagram illustrating a pulse width modulation switching power supply (SPS) in accordance with one aspect of the invention. The SPS of FIG. 3 is called a pulse width modulation circuit because it contains circuitries for modulating the duty cycle of the switch that controls the flow of current from the input source. The SPS of FIG. 3 is used herein to discuss both aspects of the prior art SPS and features of the inventive SPS although it should be kept in mind that the invention lies, in accordance with one aspect of the invention, in the control circuitries and control techniques.

Referring now to FIG. 3, there is shown an input source 302. Input source 302 may represent, for example, a battery. Input source 302 is coupled to a switch 304, which is used for regulating the flow of current from input source 302. Switch 304 is controlled by a control circuit 306. There is also shown in FIG. 3 a switch 308, which may also be controlled by circuitries within control circuit 306. Switch 304 is referred to as the high-side switch because it is on the high side of input source 302. On the other hand, switch 308 is referred to as the low-side switch because it is on the low side of input source 302. By appropriately opening and closing switches 304 and 308, control circuit 306 controls the average current through inductor 310.

For maximum efficiency, it is preferable that high-side switch 304 and low-side switch 308 have low resistive loss. Low-side switch 308 may be replaced, in one embodiment of the invention, by a diode that permits current to flow from ground to a node 314, but inhibits current from flowing from node 314 to ground. When a diode is used in place of low-side switch 308, it is not necessary to include circuitries for controlling the diode. FIG. 3 further shows an inductor 310 coupled between high-side switch 304 and a capacitor 312.

In operation, the SPS regulates current through inductor 310 by sensing a voltage Vout across capacitor 312, and closes or opens high-side switch 304 as necessary to maintain a steady regulated output voltage Vout. When high-side switch 304 is closed (responsive to a control signal from control circuit 306), current flows in the direction shown by path 320. The flow of current in path 320 causes the regulated output voltage Vout to rise across capacitor 312. When the regulated output voltage Vout rises to a predefined level, circuitries in control circuit 306 sense this condition and issue a command to open high-side switch 304, thereby bringing down the regulated output voltage Vout. In addition to controlling the average current through inductor 310, control circuitries in control circuit 306 preferably matches the average current through inductor 310 to the average current of a load 322 such that the regulated output voltage Vout is stabilized.

Furthermore, when high-side switch 304 is closed, current flows into inductor 310 and energy is stored therein according to the following equation:

$$\text{Energy in inductor } (E_L) = \tfrac{1}{2}L^*(I_{LX})^2. \tag{1}$$

$$\text{Potential across inductor } (V_L) = L\, di/dt. \tag{2}$$

If it is desired to input more current through inductor 310, control circuit 306 keeps high-side switch 304 closed for a longer period of time, thereby causing the current through inductor 310 to ramp up at a certain ramp rate for a longer period of time. When the on time of high-side switch 304 increases relative to its off time, the duty cycle of high-side switch 304 correspondingly increases (since duty cycle is the ratio of on-time divided by the time period of one cycle of the high-side switch). As is apparent from the foregoing, the duty cycle of high-side switch 304 controls the amount of current through inductor 310, thereby controlling the output voltage Vout across capacitor 312.

When control circuit 306 issues the command to open high-side switch 304, it preferably closes low-side switch 308 substantially simultaneously. As mentioned earlier, high-side switch 304 may be opened when control circuitries in control circuit 306 sense that the output voltage Vout across capacitor 312 has reached a predefined level. When high-side switch 304 is opened, current must continue to flow through inductor 310 since inductor current cannot change instantaneously. With low-side switch 308 closed, current continues to flow in path 330 through inductor 310, thereby maintaining the output voltage Vout across capacitor 312 as well as supplying current to a load 322. To further elaborate, when the inductor current $I_{LX}$ does not exceed the load current, i.e., current through load 322, current is being supplied to the load by capacitor 312 to make up the difference. On the other hand, when the inductor current $I_{LX}$ exceeds the aforementioned load current, the excess current is supplied to capacitor 312 to replenish the charge which was taken out when the inductor current $I_{LX}$ is below the load current.

When current flows in the direction of path 330, the switching power supply is said to be in a freewheeling mode. In the freewheeling mode, energy stored in inductor 310 is released to maintain the regulated output voltage Vout. At some point in time, the current supplied by inductor 310 diminishes, causing Vout to fall below another predefined value. When this condition is sensed, control circuitries within control circuit 306 issue commands to again close high-side switch 304 and open low-side switch 308 to permit current to be supplied to inductor 310 along path 320 when this happens, current is allowed to ramp up through inductor 310, thereby building up the output voltage Vout across capacitor 312.

As mentioned earlier, low-side switch 308 may be substituted by a diode, obviating the need for low-side switch control circuitries. However, the reduced complexity associated with the substitution of a diode for low-side switch 308 may be outweighed, in some cases, by an efficiency penalty since a diode usually has a forward potential drop that is typically larger than the resistive loss of a well-designed low-side switch 308.

Figure 3A:
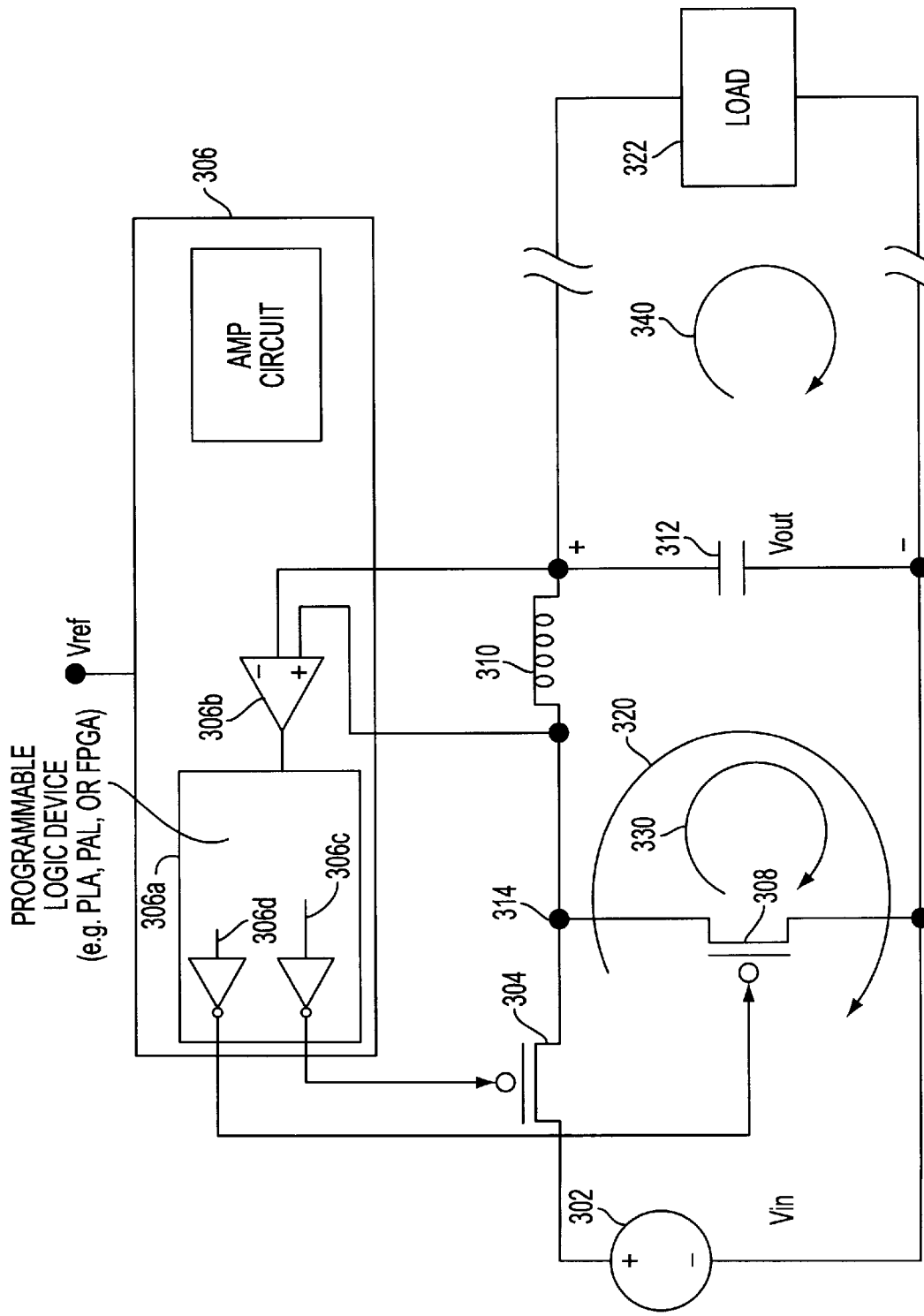
FIG. 3A is a circuit diagram illustrating a pulse width modulation switching power supply (SPS) incorporating FET transistors for the high side and low side switches and further incorporating in the control circuit, a differential amplifier to sense the current across the inductor, as well as a programmable logic device coupled to control the high side switch and low side switch in accordance with one aspect of the invention.

FIG. 3A is a circuit diagram illustrating a pulse width modulation switching power supply (SPS) incorporating FET transistors for the high side switch 304 and low side switch 308 and further incorporating in the control circuit, a programmable logic device 306a coupled to control the high side switch and low side switch, as well as a differential amplifier 306b to sense the current across the inductor in accordance with one aspect of the invention. The preceding circuit discussion of FIG. 3 is directly applicable and will not be repeated for FIG. 3A or FIG. 3B.

Both high side switch transistor 304 and low side switch transistor 308 are implemented as PMOS FET transistors. This is done by way off illustration. Alternatively these switching devices make take other forms as transistors, including but not limited to other FET transistors and bipolar transistors.

Control circuit 306 contains a programmable logic device 306a and a differential amplifier circuit 306b. The programmable logic device 306a may contain a PLA. Alternatively, the programmable logic device 306a may be a PAL-type device. Further, the programmable logic device 306a may alternatively be a FPGA. Programmable logic device 306a is coupled to high side switch 304 by logic inverter 306c and is further coupled to low side switch 308 by logic inverter 306d. Both logic inverters 306c and 206d are contained in programmable logic device 306a. Programmable logic device 306a may be further include CMOS logic circuitry. The logic inverters 306c and 306d may be CMOS logic inverters.

Control circuit 306 contains a differential amplifier circuit 306b, which is configured to sense the current flow across inductor 310. Differential amplifier circuit 306b takes as differential inputs the two terminals of inductor 310 and generates at least one digital signal coupled to input to programmable logic device 306a.

FIG. 3B is a circuit diagram illustrating a pulse width modulation switching power supply (SPS) incorporating a bipolar transistor as the high side switch 304 and a diode as the low side switch 308 in accordance with one aspect of the invention.

The high side switch 304, by way of illustration, is a PNP transistor. In other instances, high side switch 304 embodiments include, but are not limited to, other kinds of transistors, in particular, other bipolar transistors as well as FET transistors.

Figure 4:
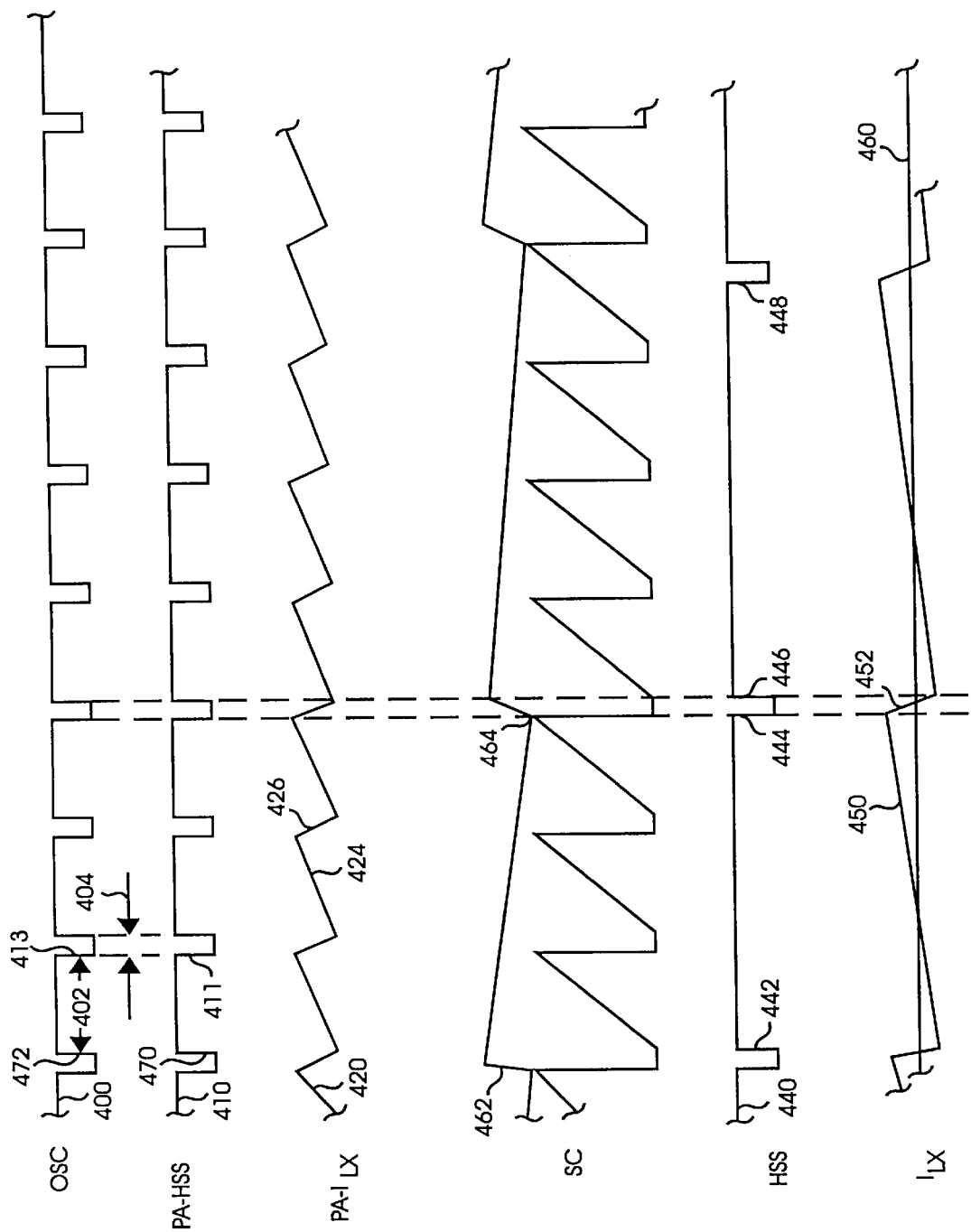
FIG. 4 illustrates, for comparison and discussion purposes, a prior art high-side switch signal, its associated prior art inductor current, a high-side switch signal in one embodiment of the inventive SPS, and its associated inductor current.

FIG. 4 illustrates, for comparison and discussion purposes, a prior art high-side switch signal (PA-HSS), its associated prior art inductor current (PA-$I_{LX}$), a high-side switch signal (HSS) of one embodiment of the inventive SPS, and its associated inductor current ($I_{LX}$). In the example of FIG. 4, the prior art high-side switch signal PA-HSS is shown to be in its drop-out mode to facilitate discussion.

Referring now to FIG. 4, there is shown an oscillator signal 400 of the types typically present in switching power supplies. Oscillator signal 400 has an on-time portion, shown as time period 402, and an off-time portion, shown as time period 404. Off-times 404 typically have a minimum duration, called the minimum dead time. The minimum dead time represents the shortest time period that the high-side switch of the switching power supply, e.g., high-side switch 304, must be off to adequately reset its analog elements when the switching power supply is in its regenerative state, i.e., when current flows in loop 330 of FIG. 3.

There is also shown in FIG. 4 a prior art high-side switch signal (PA-HSS) 410. In the prior art, the high-side switch, whose signal is represented by PA-HSS signal 410, may be turned off before oscillator signal 400 enters its off time 404. However, the prior art switching power supply requires that the high-side switch be turned off no later than the time which oscillator signal 400 makes its transition from high to low, i.e., enters its off time. In other words, the high-to-low transition of the prior art high-side switch signal (PA-HSS) 410 must occur before or substantially simultaneous with high-to-low edge 412 of oscillator signal 400. Because of this limitation in the prior art control methodology, the maximum duty cycle of signal PA-HSS 410, i.e., the time the prior art high-side switch is on relative to the total time period of one prior art high-side switch cycle, is limited. To put it another way, the maximum on-time duration of the prior art high-side switch is the duration of one oscillator signal cycle (since the prior art control methodology limits the high-side switch cycle to one oscillator signal cycle) minus the minimum dead time.

Because the prior art SPS control methodology turns off the high-side switch no later than the high-to-low transition of the oscillator signal, the maximum high-side switch duty cycle is limited to around 90%. Further, the duty cycle of the high-side switch in the prior art can be increased only if the high-side switch off times are reduced (since the oscillator frequency is fixed and the prior art control methodology limits the high-side switch cycle to one oscillator signal cycle). However, when high-side switch off times are reduced in an attempt to raise the prior art high-side switch cycle above 90%, it often becomes very difficult to reset the switching power supply's analog elements in the remaining time of the oscillator signal cycle. By way of example, switching power supplies typically require a few hundred nanoseconds, say 300 to 400 nanoseconds, between time the high-side switch is turned off and the time it is turned back on in order to properly reset the switching power supply analog elements.

FIG. 4 also shows a signal PA-$I_{LX}$ 420, representing the inductor current in the prior art switching power supply. Prior art signal PA-$I_{LX}$ 420 has a ramp-up slope 424 and a ramp-down slope 426, representing the response of the current through the inductor when the prior art high-side switch (represented by the prior art high-side switch signal PA-HSS 410) respectively closes and opens.

Referring back to FIG. 3, while the high-side switch is closed, the voltage across the inductor (VL) is represented, by the equation:

$$V_L = L * d(I_{LX})/dt \qquad (3)$$

assuming that the high-side switch has a negligible resistive loss.

While the high-side switch is open, the voltage across the inductor (VL) is represented by the equation:

$$V_L = Vin - Vout \quad (4)$$

assuming that the low-side switch also has a negligible resistive loss.

From equations (3) and (4), $$Vin - Vout = L * d(I_{LX})/dt \quad (5)$$

or $$d(I_{LX})/dt = (Vin - Vout)/L \quad (6)$$

From equation (6), $d(I_{LX})/dt$, i.e., the ramp-up slope of the inductor current when the high-side switch is closed, is proportional to (Vin−Vout). It should be noted that in equation (6), two values are fixed while the switching power supply is in regulation: 1) the output voltage Vout, which is regulated, and 2) the inductor value L, which is fixed by the designer of the switching power supply. Therefore, as the input voltage Vin approaches the regulated output voltage Vout, the right side of equation (6) approaches zero. To put it differently, the ramp-up slope of the inductor $I_{LX}$, whose magnitude is $d(I_{LX})/dt$, becomes flatter and flatter as Vin approaches Vout.

In the prior art, the drop-out voltage is effectively limited when Vin drops below a certain threshold, e.g., 5.5 V in FIG. 1, and the slope of PA-$I_{LX}$ signal 420 is no longer steep enough to provide an average current that is capable of maintaining a satisfactory output voltage Vout over the time duration of one prior art high-side switch cycle (which, as discussed earlier, is limited in the prior art by the oscillator signal cycle period).

Since the duty cycle of the high-side switch directly relates to how long, and consequently how much, current can be inputted into the switching power supply inductor, e.g., inductor 310, the fact that the duty cycle of the prior art high-side switch is limited necessarily limits the amount of current that the prior art switching power can supply to its inductor over one high-side switch cycle. Concomitantly, the ability of the prior art SPS to stay in regulation in response to a diminishing Vin is also limited. By way of example, when the input voltage Vin drops to the point where the high-side switch needs to stay on for longer than one oscillator signal cycle to adequately ramp up the inductor current and to maintain the desired regulated output voltage Vout, the prior art switching power supply typically cannot facilitate this and goes out of regulation as a result.

Note that the ramp-down slope of the inductor current signal has a constant slope regardless of the value of Vin. This is because during the time when the high-side switch is off, the low-side switch, e.g., low-side switch 308 of FIG. 3, closes, thereby shorting one end of inductor 310 to and causing current to flow in the direction of path 330 of FIG. 3. The voltage across inductor 310 is therefore the inverse of the voltage across capacitor 312 (assuming very little resistive loss through the low-side switch)

$$V_L = -Vout. \quad (7)$$

Since $V_L = L * d(I_{LX})/dt$, it follows from eq. (7) that $$Vout = -L * d(I_{LX})/dt \quad (8)$$

Therefore, $$d(I_{LX})/dt = -Vout/L \quad (9)$$

Again, it should be noted that the regulated output voltage Vout is at a fixed value while the switching power supply is in regulation, and the value of inductor L is fixed by the design of the switching power supply. Therefore, the ramp-down slope has a slope which is proportional to a constant quantity as long as the switching power supply stays in regulation.

Because the inductor current diminishes during the regenerative state of the switching power supply (i.e., when high-side switch 304 opens and current flows in path 330), it is necessary for the inductor current to ramp-up by a certain amount when the high-side switch closes to maintain an average inductor current that is sufficient to maintain the desired output voltage Vout. In equilibrium, this average current should be equal to the load current because no net current should flow into the capacitor, e.g., capacitor 312, over a cycle of the high-side switch.

In accordance with one aspect of the present invention, logics within control circuit 306 preferably keep high-side switch 304 closed for a longer period of time than one oscillator signal cycle when necessary. In other words, the present invention allows the current through inductor 310 to ramp up, when necessary, over a time period which is greater than the duration of one oscillator signal cycle. When input voltage Vin is sufficiently high, the high-side switch turns off every oscillator signal cycle as was the case in the prior art. However, when the input voltage Vin approaches the regulated output value Vout and the ramp up slope of the inductor current $I_{LX}$ line becomes less steep, the inventive switching power supply advantageously permits the high-side switch to stay on for a longer period of time to ensure that the inductor current is ramped up to a sufficient level to maintain the desirable regulated output voltage Vout.

In accordance with this aspect of the invention, the inventive switch control technique preferably skips oscillator off times, e.g., off-time periods 404 of FIG. 4, to permit the high-side switch to stay closed for a time duration that is longer than a cycle period of the oscillator signal. In one embodiment, the inventive switching power supply skips off times of the oscillator signal when control circuit 306 is informed, via an input voltage monitoring circuit, that the input voltage Vin has dropped to the point where an increase in the duty cycle of the high-side switch above the prior art maximum is necessary to maintain the desired regulated output voltage Vout.

By skipping oscillator off times, the invention advantageously increases the duty cycle of the high-side switch while maintaining a minimum high-side switch off time that is sufficient to reset the analog elements of the switching power supply. By way of contrast, the prior art high-side switch cycle is confined within one oscillator signal cycle, and there is no way to extend the duty cycle of the high-side switch once the input voltage Vin drops to the point where the high side switch needs to stay on for longer than one oscillator signal cycle period if the desired regulated voltage Vout is to be maintained. Further, it is preferable that off times are skipped only to the extent necessary to maintain the desired regulated output voltage Vout. In other words, the high-side switch on time is extended in a step-wise manner, i.e., by skipping one oscillator signal cycle off time at a time.

To further illustrate the above, there is shown in FIG. 4 a high-side switch signal 440 in accordance with one embodiment of the present invention. By way of example, high-side switch signal 440 is shown to have skipped two oscillator off times between rising edge 442 and falling edge 444 when the input voltage Vin (not shown) drops to the point where the high side switch needs to stay on for longer than one oscillator signal cycle period to adequately ramp up the inductor current and to maintain the desired regulated voltage Vout. Further, high-side switch signal 440 is shown to have skipped three oscillator off times between rising edge 446 and falling edge 448 when the input voltage Vin drops to the point where the high side switch needs to stay on for longer than two oscillator signal cycle periods to adequately ramp up the inductor current and maintain the desired regulated voltage Vout.

As mentioned earlier, the ramp up slope of the inductor current $I_{LX}$ becomes flatter and flatter as Vin-Vout approaches zero. The inventive switching power supply preferably matches the duty cycle of the high-side switch with input voltage Vin such that the amplitude of ramp-up slope of $I_{LX}$ (slope 450) equals the amplitude of the ramp-down down slope of $I_{LX}$ (slope 552), thereby keeping the amount of current flowing into the load at equilibrium. By way of example, if Vin equals 9 V, slope 450 of $I_{LX}$ would be significantly steeper and would meet the relatively constant ramp-down slope 452 at an earlier point in time. In this case, the duty cycle of the inventive high-side switch may end earlier than the case where Vin approaches Vout, say Vin=6 V, and the ramp-up slope 450 is less steep, necessitating a long ramp-up time, i.e., a higher high-side switch duty cycle, before the ramp-up slope 450 intersects ramp-down slope 452.

There is provided a slope comp (SC) signal in FIG. 4, which is preferably a triangular signal generated from the oscillator signal 400. Further, the SC signal and oscillator signal 400 typically have the same frequency. In one embodiment, however, the slope comp SC signal does not have to be a triangular signal and may instead be a level signal, which may even be zero. FIG. 4 further shows a composite signal 462. Composite signal 462 represents, in one embodiment, the sum of an error signal and the mirror image of a voltage corresponding to inductor current $I_{LX}$. The error signal equals the difference between a reference voltage, which is at a fixed potential level, and the output voltage Vout across capacitor 312, i.e., Vout−Vref. The mirror image of a voltage corresponding to inductor current $I_{LX}$ may represent, for example, a voltage taken across a small resistor, i.e., $I_{LX}*R$, to provide an indication of the strength of $I_{LX}$.

When the composite signal 462 equals the slope comp SC signal, e.g., at point 464, the AMP signal goes high. When the inductor current $I_{LX}$ is raised or when the error signal decreases, e.g., when Vout is close to Vref, the value of ((Vout−Vref)−$I_{LX}*R$)), i.e., the composite signal 462, has a lower value. Consequently, composite signal 462 crosses the slope comp SC earlier in an oscillator cycle, thereby causing the AMP signal to be asserted sooner to terminate the on state of the high-side switch earlier in the oscillator cycle and lower the high-side switch duty cycle. Conversely, when the inductor current $I_{LX}$ is lowered or when the error signal increases, e.g., when Vout is far away from Vref, the value of ((Vout−Vref)−$I_{LX}*R$)), i.e., the composite signal 462, has a higher value. Consequently, composite signal 462 crosses the slope comp SC later in an oscillator cycle, thereby causing the AMP signal to be asserted later to terminate the on state of the high-side switch later in the oscillator cycle and increasing the high-side switch duty cycle.

Figure 5:
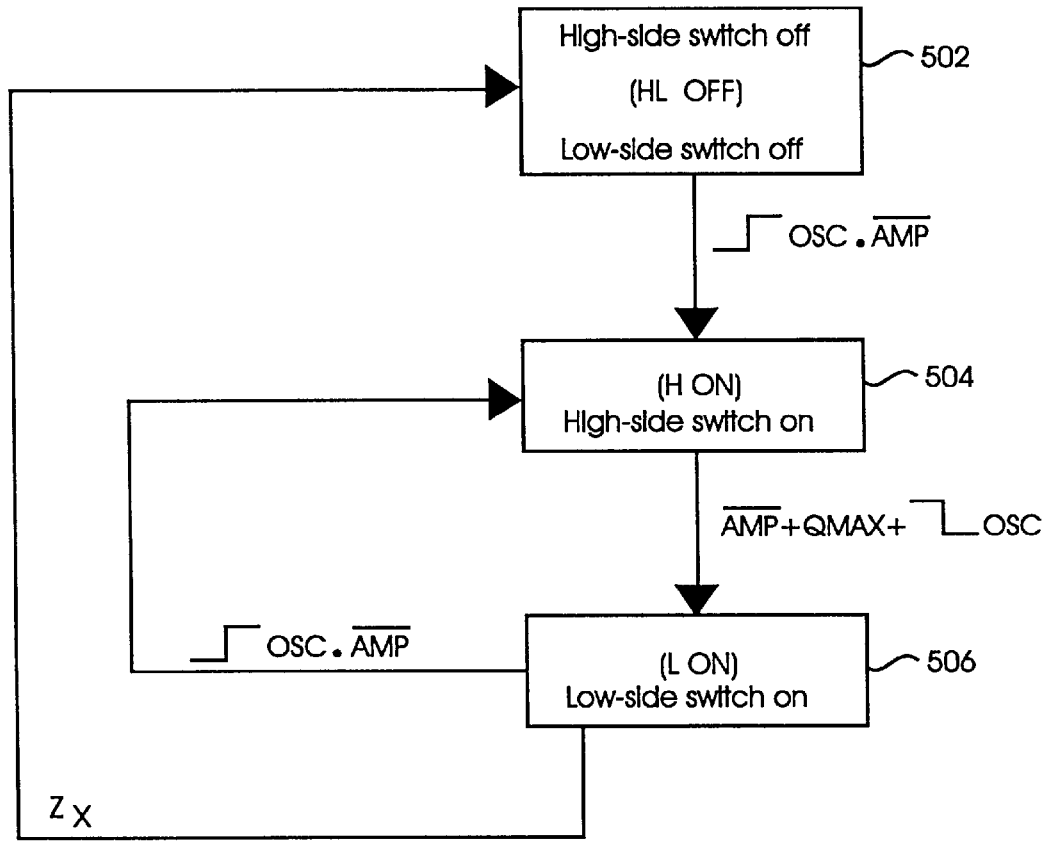
FIG. 5 is a flowchart illustrating the prior art control state diagram.

FIG. 5 is a flowchart illustrating the prior art control state diagram for controlling both the high-side switch and the low-side switch of the prior art SPS. In FIG. 5, there is shown a state 502 (HL OFF) in which both the high-side switch and the low-side switch are off. Corresponding to FIG. 3, both high-side switch 304 and low-side switch 308 are open in state 502 (HL OFF), and current flows in the direction of path 340.

When current flows in the direction of path 340 in the HL OFF state 502, inductor 310 is removed from the current loop. In this case, current is continued to be supplied to the load by capacitor 312. As stored energy is drawn from capacitor 312, the output voltage Vout across capacitor 312 drops.

When the AMP signal goes low, indicating that the output voltage Vout across capacitor 312 is unsatisfactory, the high-side switch is turned on at the low-to-high transition of the oscillator signal. As mentioned earlier, when the high-side switch, e.g., high-side switch 304 of FIG. 3, is on, current flows into inductor 310 and capacitor 312 along path 320. The on state of the high-side switch is shown by state 504 (H ON) in FIG. 5. With reference to FIG. 4, the turning on of the prior art high-side switch is shown by the low-to-high transition edge 470, which is substantially in line with rising edge 472 of the oscillator signal 400.

The high-side switch will stay on in the prior art state 504 (H ON) until one of three things happen. Firstly, the AMP signal goes high. In this case, the high-side switch is turned off and the low-side switch is turned on to allow the prior art switching power supply to enter its regenerative state.

Secondly, state 504 (H ON) is exited when a signal QMAX goes high, indicating that a high current limit condition has been sensed. A high current limit condition exists when the inductor current exceeds a predefined high current limit value. In this case, the high-side switch is also turned off to prevent possible damage to the switching power supply and/or the device to which the switching power supply is connected.

The high current limit condition may be sensed across a small resistor (not shown in FIG. 3) that is connected in series with the inductor. In one embodiment, the same resistor that is used to measure the strength of inductor current $I_{LX}$ as discussed in connection with FIG. 4 may be used to sense the high current limit condition. A comparator then senses the current through this resistor and generates a signal QMAX if the current sensed across this resistor is greater than a predefined value. Alternatively, a comparator may sense the high current limit condition by comparing a voltage across this resistor with a reference voltage. It has also been found that the resistance of the high-side switch itself may be used to generate a potential difference, which could then be compared with a reference voltage to ascertain the high current limit condition when the high-side switch is closed. There are also other methods known in the art for detecting the high current limit condition including, for example, using transformers and the like. Note that the high current limit that causes the signal QMAX to go high and the high-side switch to turn off should preferably be greater than the current to be supplied to the load.

Thirdly, state 504 (H ON) is exited when the oscillator signal goes low. Note that the prior art SPS turns off the high-side switch when the oscillator signal makes its transition from high to low irrespective of the AMP signal. Turning the high-side switch off when the oscillator signal goes low represents a way in the prior art to assure that the high-side switch will be off for a minimum time period prior to the next low-to-high transition of the oscillator signal when the prior art SPS turns on its high-side switch. With respect to FIG. 5, when the oscillator signal makes its transition from high to low, the prior art switching power supply switches states from 504 (H ON) to 506 (L ON).

The high-side switch of the prior art is turned on again when the AMP signal goes low and the oscillator signal makes its transition from low-to-high. When this happens, state 506 (L ON) is exited and the prior art method returns to state 504 (H ON). If the AMP signal goes low shortly after the oscillator signal goes high, the prior art SPS must defer the turning on of its high-side switch. This is because the high-side switch of the prior art SPS only goes high from state 506 (L ON) upon the transition from low to high of the oscillator signal and when the AMP signal is low.

State 506 (L ON) is also exited when the inductor current goes to zero. When this happens, a zero-crossing (Zx) condition will be detected. In one embodiment, the zero-crossing condition is detected by detecting the voltage drop across a resistor (not shown in FIG. 3), which is connected in series with inductor 310. Alternatively, the zero-crossing condition may be ascertained by detecting a voltage drop across the low-side switch itself when the low-side switch is closed.

When the zero-crossing condition is detected, the prior art switching power supply returns from state 506 (L ON) back to state 502 (HL OFF), and both the high-side switch and the low-side switch are turned off. Turning off both the low-side switch and the high-side switch in state 502 (HL OFF) upon detecting the zero-crossing condition prevents the inductor current from reversing, which may undesirably cause current to flow out of the load.

Figure 6:
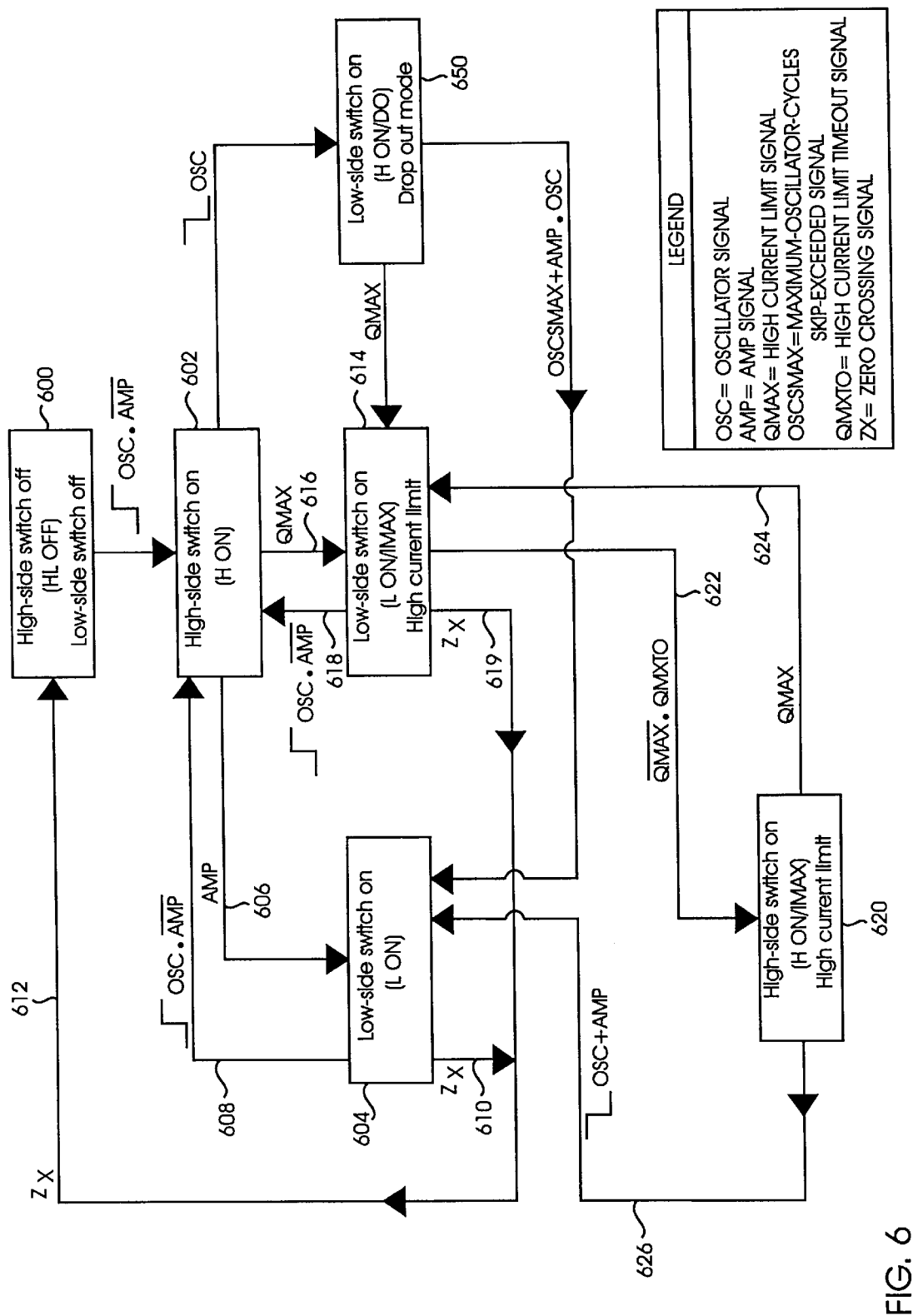
FIG. 6 is a state diagram illustrating the inventive control technique in accordance with one aspect of the invention.

FIG. 6 is a state diagram illustrating the inventive control technique in accordance with one aspect of the invention. The state diagram illustrating the inventive control technique may be implemented using CMOS logics, standard digital logics, or some type of programmable logics such as gate arrays, PLA's/PAL's, FPGA's or the like. In FIG. 6, there are again a high-side switch and a low-side switch. When one of them is on, the other is preferably off.

State 600 (HL OFF) represents the situation where both the high-side switch and the low-side switch are off. As discussed earlier in connection with FIG. 5, when both the high-side switch and the low-side switch are off, energy is supplied from capacitor 312 of FIG. 3 to the load. At some point in time, the output voltage Vout across capacitor 31.2 falls below a predefined level. When this happens, a signal AMP goes low to signify the low level of output voltage Vout.

When the AMP signal goes low, the inventive switching power supply makes its transition from state 600 (HL OFF) to state 602 (H ON) at the next low-to-high transition of the oscillator signal. In state 602 (H ON), the high-side switch is turned on. During the time period when the switching power supply is in state 602 (H ON), current flows in the direction of path 320 of FIG. 3 to ramp up the current through inductor 310 to maintain the desired regulated output voltage Vout across capacitor 312. The inventive switching power supply may exit state 602 (H ON) upon the occurrence of any of the below three events.

First, the AMP signal may go high. When this happens, the high-side switch is turned off, and the inventive switching power supply switches from state 602 (H ON) to state 604 (L ON) via path 606.

In state 604 (L ON), the low-side switch is turned on, to permit the analog devices in the inventive switching power supply to reset themselves. Energy stored in inductor 310 is released in the form of current to the load. As $I_{LX}$ drops, a. low AMP signal is generated, causing the inventive switching power supply to sense this condition and turn the high-side switch back on, preferably on the next low-to-high transition of the oscillator signal. In the diagram of FIG. 6, the turning on of the high-side switch is represented by the change from state 604 (L ON) back to state 602 (H ON) via path 608. In state 602 (H ON), the on state of high-side switch causes the inductor current to again ramp up, thereby causing the output voltage Vout across capacitor 312 to begin building up again.

Note that the transitions between states 602 (H ON) and 604 (L ON) via paths 606 and 608 represent the normal operation of the high-side switch when the input voltage Vin is sufficiently high to allow the inventive switching power supply to stay in regulation without having to skip oscillator off times.

State 604 (L ON) is also exited when a zero-crossing (Zx) condition is detected. Upon the detection of a zero-crossing condition, the inventive switching power supply exits state 604 (L ON) via paths 610 and 612 to return to state 600 (HL OFF). As discussed earlier in connection with FIG. 5, the zero-crossing condition occurs when the inductor current goes to zero and the inventive switching power supply preferably turns off both the low-side and the high-side switches to prevent the inductor current from reversing and causing current to flow out of the load.

In state 602 (H ON), if a high current limit condition is encountered, the inventive switching power supply switches from state 602 (H ON) to a state 614 (L ON/IMAX) via a path 616 wherein the high-side switch is turned off, and the low-side switch is turned on. In one embodiment, the high current limit condition is evidenced by the assertion of the aforementioned QMAX signal. Note that the only way the switching power supply can enter state 614 (L ON/IMAX) from state 602 (H ON) is through a detection of a high current limit condition, i.e., when the inductor current exceeds a predefined high current limit value.

When the inventive switching power supply is in state 614 (L ON/IMAX), it may return to state 602 (H ON) via a path 618 when the AMP signal goes low. Further, it is preferable that the change from state 614 back to state 602 occurs at the low-to-high transition of the oscillator signal. The condition that causes the switching power supply to move from state 614 (L ON/IMAX) back to state 602 (H ON) is substantially similar to that which causes the inventive switching power supply to return from state 604 (L ON) to state 602 (H ON).

When the inventive switching power supply is in state 614 (L ON/IMAX), the detection of a zero-crossing (Zx) condition, i.e., when the inductor current goes to zero, also causes the inventive switching power supply to exit state 614 (L ON/IMAX). Upon a detection of the zero-crossing condition, the inventive switching power supply preferably returns to state 600 (HL OFF) via paths 619 and 612 as shown in FIG. 6.

Further, the inventive switching power supply may exit state 614 (L ON/IMAX) when the high current limit condition is no longer present (i.e., when the current through the inductor has dropped down below the predefined high current limit), and a predefined time period has elapsed since the high current limit condition was detected. In one embodiment, this condition causes the inventive switching power supply to move from state 614 (L ON/IMAX) to a state 620 (H ON/IMAX) wherein the highside switch is turned back on. Note that in state 620, the high-side switch does not necessarily have to be turned on at the start of an oscillator signal cycle. The transition from state 614 (L ON/IMAX) to state 620 (H ON/IMAX) is accomplished via path 622.

In one embodiment, a signal QMXTO goes high after a predefined time period has elapsed since the high current limit condition was detected. The predefined time period which triggers the assertion of signal QMXTO is preferably a nonarbitrary period of time but may be zero in one embodiment. Signal QMXTO may be generated by, for example, a one-shot timer that starts upon the assertion of the QMAX signal. The utilization of state 620 (H ON/IMAX) advantageously prevents the inductor current from ramping down so far that it is not possible to maintain equilibrium, i.e., to return, at the start of the next high-side switch cycle, to the level of inductor current that exists at the start of the previous high-side switch cycle.

In state 620 (H ON/IMAX), the high-side switch is again turned on as mentioned previously. If a high current limit condition is again encountered, signal QMAX again goes high, causing the inventive switching power supply to make its transition from state 620 (H ON/IMAX) back to state 614 (L ON/IMAX) via a path 624. Note that it is possible, in some cases, for the inventive switching power supply to make the transition back and forth between states 614 (L ON/IMAX) and 620 (H ON/IMAX) via paths 622 and 624 respectively more than once.

When the inventive switching power supply is in state 620 (H ON/IMAX) and the signal AMP goes high, the inventive switching power supply makes its transition from state 620 (H ON/IMAX) back to state 604 (L ON). The transition from state 620 (H ON/IMAX) back to state 604 (L ON) also occurs when the oscillator signal makes its transition from high to low. The transition from state 620 (H ON/IMAX) back to state 604 (L ON) is accomplished via path 626 as shown in FIG. 6.

It should be noted that states 614 (L ON/IMAX) and 620 (H ON/IMAX) in the flowchart of FIG. 6 are optional and are provided to prevent an excess amount of inductor current from damaging the inventive switching power supply and/or the electrical device to which the inventive switching power supply is connected. For example, if the high current limit is substantially higher than the operating level of the inductor current, the high current limit condition may never be encountered. It that case, it may be possible to remove states 614 (L ON/IMAX) and 620 (H ON/IMAX) as well as paths 616, 618, 619, 622, 624, and 626. When state 614 (L ON/IMAX) is removed from FIG. 6, the detection of a high current limit condition while the SPS is in state 602 (H ON) may instead cause the inventive switching power supply to enter state 604 (L ON) directly from state 602 (H ON).

As mentioned earlier, if the transition from high to low of the oscillator signal is encountered when the high-side switch was on, the prior art control technique automatically turns off the high-side switch and terminates the ramping up of the inductor current. In one embodiment of the present invention, if the falling edge of the oscillator signal is encountered before assertion of the AMP signal, or before the high current limit condition is encountered (e.g., before the assertion of the QMAX signal in one embodiment), the invention advantageously keeps the high-side switch closed beyond the oscillator signal off time.

When this happens, the inventive switching power supply makes its transition from state 602 (H ON) to a state 650 (H ON/DO), representing the state wherein the high-side switch is on but the switching power supply is in a drop-out mode. In this mode, inductor current $I_{LX}$ is advantageously allowed to continue ramping up irrespective whether high-side switch 304 has been kept on past the high-to-low transition of the oscillator signal. The fact that high-side switch 304 of the inventive switching power supply is kept on past one oscillator signal cycle is illustrated in FIG. 4 as the on time of high-side switch signal 440 extends past high-to-low edge 413 of oscillator signal 400.

If the high current limit condition is encountered in state 650 (H ON/DO) (e.g., when QMAX signal is high in one embodiment), it is preferable to stop the inductor current from continuing to ramp up. Consequently, the inventive switching power supply exits state 650 (H ON/DO) and enters state 614 (L ON/IMAX), wherein high-side switch 304 is turned off and low-side switch 308 is turned on. The behavior of the inventive switching power supply in state 614 (L ON/IMAX) has been discussed earlier. Note that when the high current limit condition is encountered, the drop-out mode of state 650 (H ON/DO) is immediately terminated regardless of how many oscillator signal cycles the on-time of high-side switch 304 has extended past.

It should also be noted that if optional states 614 (L ON/IMAX) and 620 (H ON/IMAX) are not provided, as is the case in one embodiment, the assertion of the QMAX signal in state 650 (H ON/DO) responsive to a high current limit condition causes the inventive switching power supply to make a transition from state 650 (H ON/DO) directly to state 604 (L ON). The behavior of the inventive switching power supply in state 604 (L ON) has also been discussed previously.

Further, when the inventive switching power supply is in state 650 (H ON/DO), high-side switch 304 preferably turns off if the AMP signal goes high. However, there is imposed, in one embodiment, an additional restriction in state 650 (H ON/DO) that the high-side switch turns off only if the oscillator signal is high. This is because it is preferable not to turn off high-side switch 304 during an oscillator off time since there may be insufficient time to reset all analog elements before the next low-to-high transition of the oscillator signal (when the high-side switch. is turned on). If the high-side switch had been allowed to turn off during an oscillator off time, the switching power supply may fail when its high-side switch is turned on again at the next low-to-high transition of the oscillator signal. Alternatively, the switching power supply must wait for an entire oscillator signal cycle before the high-side switch can be turned on again, which degrades its high-side switch duty cycle.

Furthermore, state 650 (H ON/DO) may terminate upon a high-to-low transition edge of the oscillator signal after a predefined maximum number of oscillator signal cycle off times have been skipped. In one embodiment, a counter is used to keep track of the number of oscillator signal cycle off times skipped and to generate the appropriate OSCSMAX signal which causes the inventive switching power supply to enter state 604 (L ON) from state 650 (H ON/DO).

It should be noted that the high-side switch of the inventive switching power supply may stay on continuously past any arbitrary number of oscillator signal cycle off times. In general, the greater the number of oscillator signal cycle off times skipped, the higher the high-side switch duty cycle. In one embodiment, allowing the on state of high-side switch 304 to extend past up to three oscillator signal cycle off times has been found to be suitable. The skipping of up to three oscillator signal cycle off times raises the duty cycle of the high-side switch to approximately 98 percent. It has been found that while the skipping of additional oscillator signal cycle off times, i.e., beyond three, may be advantageous in certain cases, the incremental improvement in the duty cycle diminishes with each additional oscillator signal cycle off time skipped. In some cases, it may be preferable to turn off the high-side switch at some point, i.e., switch 304 of FIG. 3, in order to reset the analog devices of the switching power supply.

In one embodiment, it is preferable to assert the OSCSMAX signal at the high-to-low transition edge of the oscillator signal. Further, the fact that high-side switch 304 turns off (from state 650 due to the assertion of the OSCSMAX signal) on a falling edge of an oscillator signal advantageously permits the inventive switching power supply to have enough time to reset its analog elements before turning on again at the next low-to-high transition of the oscillator signal. If the on state of the high-side switch in state 650 (H ON/DO) had been allowed to terminate before the oscillator signal makes its transition from high to low, the high-side switch would have to wait for a longer time period before the next low-to-high transition of the oscillator signal, thereby lengthening the high-side switch off time and reducing the high-side switch effective duty cycle.

By turning off high-side switch 304 in state 650 at the high-to-low transition edge of the oscillator signal after signal OSCSMAX is asserted, the inventive switching power supply advantageously keep the effective off time of the high-side switch cycle to a minimum, thereby maximizing the duty cycle of the high-side switch. As mentioned earlier, it is desirable to keep the duty cycle of the high-side switch as high as possible in order to minimize the drop-out voltage and to allow the switching power supply to stay in regulation longer in the presence of a falling input voltage Vin.

Although only a few embodiments of the present invention have been described in detail, it should be understood that the present invention may be embodied in many other specific forms without departing from the spirit or scope of the invention. For example, the invention has been discussed in detail based on an assumption that there exists a low-side switch in the inventive switching power supply and that it is necessary to supply a control signal to turn on or off the low-side switch at appropriate times to, for example, prevent current from flowing back out of the load. As mentioned earlier, however, an inventive switching power supply may be constructed using a diode in place of the low-side switch to simplify the control circuitries in control circuit 306. If low-side switch 308 is replaced by a diode or similar devices that permit current to flow from ground toward the high-side switch and blocks current from flowing the other way, control of the low-side switch is not necessary. Such substitutions and variations on the inventive concepts are possible and are within the skills of one skilled in the art given this disclosure. In view of the foregoing, it should be apparent that the present examples are to be considered as illustrative and not restrictive, and the invention is not to be limited to the details given herein, but may be modified within the scope of the appended claims.

What is claimed is:

1. A control device suitable for controlling a switching power supply in order to generate an output voltage from an input power supply having first and second terminals and providing an input voltage to the switching power supply, the switching power supply including a high switch having first and second terminals, the first high switch terminal coupled to the first input power supply terminal, an oscillator periodically cycling between a plurality of on and off states, an inductor having first and second terminals, the first inductor terminal electrically coupled to the second high switch terminal such that when the high switch is closed the inductor is electrically coupled to the input power supply, a capacitor having first and second terminals, the first capacitor terminal electrically coupled to the second inductor terminal and the second capacitor terminal electrically coupled to the second input power supply terminal, the control device comprising:

means for closing the high switch substantially simultaneous with a start of a first on state of the oscillator signal if the output voltage is less than a predefined value, the closing of the high switch permitting current from the input source to flow through the inductor and the capacitor thereby building up an inductor current through the inductor and increasing the output voltage across the capacitor;

means for opening the high switch substantially simultaneous with the output voltage transitioning from less than the predefined value to the predefined value; and means for keeping the high switch closed past a first off state of the oscillator signal immediately following the first on state of the oscillator signal to continue building up the inductor current through the inductor and increasing the output voltage across the capacitor if the output voltage is not at least equal to the predefined value at the start of the first off state of the oscillator signal.

2. A control device as recited in claim 1 further including means for opening the high switch after a predefined number of oscillator signal cycles have occurred.

3. A control device as recited in claim 1 wherein a portion of the control device is implemented within CMOS logic.

4. A control device as recited in claim 1 wherein a portion of the control device is implemented within programmable logic.

5. A control device as recited in claim 1 wherein the programmable logic includes one type of programmable logic selected from the group consisting of PLAs, PALs, and FPGAs.

6. A control device as recited in claim 1 wherein the switching power supply further includes a low switch having first and second terminals, the first low switch terminal coupled to the second capacitor terminal and the second low switch terminal couple to the first inductor terminal, the control device further including means for opening the low switch substantially simultaneously with closing the high switch.

7. A control device as recited in claim 6 further including means for closing the low switch substantially simultaneously with opening the high switch in response to the output voltage transitioning from less than the predefined value to the predefined value.

8. A control device as recited in claim 6 further including means for sensing a current flowing through the inductor and means for opening both the low switch and the high switch when the inductor current is about zero (0) amps.

9. A control device as recited in claim 6 further including means for sensing a current flowing through the inductor and means for opening the high switch and closing the low switch when the inductor current exceeds a predefined maximum value.

10. A switching power supply operable for generating an output voltage from an input power supply having first and second terminals and providing an input voltage, the switching power supply comprising:

a high switch having first and second terminals, the first high switch terminal coupled to the first input power supply terminal;

an oscillator periodically cycling between a plurality of on and off states;

an inductor having first and second terminals, the first inductor terminal electrically coupled to the second high switch terminal such that when the high switch is closed the inductor is electrically coupled to the input power supply;

a capacitor having first and second terminals, the first capacitor terminal electrically coupled to the second inductor terminal and the second capacitor terminal electrically coupled to the second input power supply terminal; and a control device coupled to the high switch and the oscillator, the control device operable to:
  a) close the high switch substantially simultaneous with a start of a first on state of the oscillator signal if the output voltage is less than a predefined value, the closing of the high switch permitting current from the input source to flow through the inductor and the capacitor thereby building up an inductor current through the inductor and increasing the output voltage across the capacitor;
  b) open the high switch substantially simultaneous with the output voltage transitioning from less than the predefined value to the predefined value; and
  c) keep the high switch closed past a first off state of the oscillator signal immediately following the first on state of the oscillator signal to continue building up the inductor current through the inductor and increasing the output voltage across the capacitor if the output voltage is not at least equal to the predefined value at the start of the first off state of the oscillator signal.

11. A switching power supply as recited in claim 10 further including a low switch having first and second terminals, the first low switch terminal coupled to the second capacitor terminal and the second low switch terminal coupled to the first inductor terminal.

12. A switching power supply as recited in claim 11 wherein the low switch is a transistor.

13. A switching power supply as recited in claim 11 wherein the control device is coupled to the low switch and is operable to control the low switch such that when the high switch is closed the low switch is open.

14. A switching power supply as recited in claim 11 wherein the control device is operable to close the low switch substantially simultaneously with opening the high switch in response to the output voltage transitioning from less than the predefined value to greater than or equal to the predefined value.

15. A switching power supply as recited in claim 11 wherein the control device is operable to sense a current flowing through the inductor and open both the low switch and the high switch when the inductor current is about zero (0) amps.

16. A switching power supply as recited in claim 11 wherein the control device is operable to sense a current flowing through the inductor and when the inductor current exceeds a predefined maximum value, the control device responds by opening the high switch and closing the low switch.

17. A switching power supply as recited in claim 10 wherein the control device includes programmable logic.

18. A switching power supply as recited in claim 17 wherein the programmable logic includes one type of programmable logic selected from the group consisting of PLAs, PALs, and FPGAs.

19. A switching power supply as recited in claim 10 wherein the control device is further operable to open the high switch after a predefined number of oscillator signal cycles have occurred.

20. A switching power supply as recited in claim 10 wherein the high switch is a transistor.

21. A switching power supply as recited in claim 20 wherein the transistor is a field effect transistor.

22. A switching power supply as recited in claim 20 wherein the transistor is a bipolar transistor.

23. A switching power supply as recited in claim 10 wherein the control device includes CMOS logic.

24. A switching power supply as recited in claim 10 further including a diode coupled between the first inductor terminal and the second capacitor terminal such that current may flow through the diode from the second capacitor terminal to the first inductor terminal.

25. A method for generating an output voltage from an input voltage supplied by an input source in a switching power supply having a high switch, an oscillator signal periodically cycling between a plurality of on and off states, an inductor coupled to the high switch, and a capacitor coupled to the inductor, the method comprising:
  closing the high switch substantially simultaneous with a start of a first on state of the oscillator signal if the output voltage is less than a predefined value, the closing of the high switch permitting current from the input source to flow through the inductor and the capacitor thereby building up an inductor current through the inductor and increasing the output voltage across the capacitor;
  opening the high switch substantially simultaneous with the output voltage transitioning from less than the predefined value to the predefined value; and
  keeping the high switch closed past a first off state of the oscillator signal following the first on state of the oscillator signal thereby continuing to build up the inductor current through the inductor and increase the output voltage across the capacitor if the output voltage is not at least equal to the predefined value at the start of the first off state of the oscillator signal.

26. A method as recited in claim 25 wherein the switching power supply further has a low switch coupled between a) the connection of the inductor and the capacitor and b) the connection of the capacitor and the input power supply, the method further including the act of opening the low switch substantially simultaneous with any closing of the high switch.

27. A method as recited in claim 26 further including the acts of:
  sensing a current flowing through the inductor; and
  opening both the low switch and the high switch when the inductor current is about zero (0) amps.

28. A method as recited in claim 26 further including the acts of:
  sensing a current flowing through the inductor;
  determining whether the inductor current exceeds a predefined maximum value; and
  opening the high switch and closing the low switch when the inductor current exceeds the predefined maximum value.

* * * * *